United States Patent [19]

Fearon et al.

[11] 4,231,909

[45] Nov. 4, 1980

[54] POLYCHLOROPROPYLSILOXANE PLASTICIZED POLYVINYL CHLORIDE COMPOSITIONS

[75] Inventors: Frederick W. G. Fearon, Valparaiso, Ind.; Gary A. Vincent, Midland, Mich.

[73] Assignee: Dow Corning Corporation, Midland, Mich.

[21] Appl. No.: 34,820

[22] Filed: Apr. 30, 1979

[51] Int. Cl.$^3$ .................. C08L 27/06; C08L 83/08
[52] U.S. Cl. ........................................... 260/29.1 SB
[58] Field of Search .................. 260/29.1 SB, 827

[56] References Cited

U.S. PATENT DOCUMENTS

| | | | |
|---|---|---|---|
| 3,332,900 | 7/1967 | Reischl et al. | 260/29.1 |
| 3,428,707 | 2/1967 | Amos et al. | 260/29.1 |
| 3,686,356 | 8/1972 | Saam | 260/825 |
| 3,691,257 | 9/1972 | Kendrick et al. | 260/827 |
| 3,730,931 | 5/1973 | Simoneau et al. | 528/42 |

FOREIGN PATENT DOCUMENTS

| | | | |
|---|---|---|---|
| 602400 | 7/1960 | Canada | 528/42 |
| 5188543 | 11/1974 | Japan | 260/29.1 SB |
| 691628 | 5/1953 | United Kingdom | 260/29.1 SB |

*Primary Examiner*—Joseph L. Schofer
*Assistant Examiner*—Peter F. Kulkosky
*Attorney, Agent, or Firm*—James E. Bittell

[57] ABSTRACT

A plasticized polyvinyl chloride composition consisting essentially of polyvinyl chloride resin and a polysiloxane fluid containing at least 10 mole percent of 3-chloropropyl functional siloxane units is described. The compositions have increased flexibility and reduced tendency to exude silicone to the surface.

3 Claims, No Drawings

POLYCHLOROPROPYLSILOXANE PLASTICIZED POLYVINYL CHLORIDE COMPOSITIONS

BACKGROUND OF THE INVENTION

This invention relates to polyvinyl chloride resin compositions that are plasticized with polyorganosiloxanes. More specifically this invention relates to blends of polyvinyl chloride resin and polychloropropylsiloxane fluids.

Polyvinyl chloride resins have become widely used thermoplastics because their properties can be modified by plasticizers to adapt them for many varied applications. Commonly employed plasticizers include phthalate esters, aliphatic diacid esters, phosphate esters, and epoxidized oils. Although these plasticizers have been employed to provide polyvinyl chloride compositions with many desired properties, problems are still encountered in some applications of the compositions. For example, compositions may be limited in use because of the flammability, volatility or ease of extraction of the plasticizer.

It is known from U.S. Pat. No. 3,428,707 that dialkyl, diphenyl, or alkylphenyl polysiloxanes can be incorporated into an organic modified high impact strength polyvinyl chloride resin to improve the properties of the resin. The improvement of any particular property is often temporary since the polyorganosiloxanes exude from the polyvinyl chloride. This incompatibility of polyorganosiloxanes and thermoplastics such as polyvinyl chloride has impeded the use of polyorganosiloxanes as plasticizers in many cases. Thus, considerable attention has been applied to finding ways to obtain compatible compositions of polysiloxanes and thermoplastics such as polyvinyl chloride.

One method of improving the compatibility of polyorganosiloxanes with polyvinyl chloride is to form a copolymer of the polyorganosiloxane with an organic polymer that is more compatible with the polyvinyl chloride. For example, U.S. Pat. No. 3,332,900 describes a polyorganosiloxane-polyisocyanate copolymer which is compatible with polyvinyl chloride and useful as a lubricant and plasticizer. More generally, U.S. Pat. No. 3,691,257 describes copolymers containing polyorganosiloxane blocks and organic blocks which are employed in polyvinyl chloride and other thermoplastics to improve the permanence of property modifications by polyorganosiloxanes.

Another method of obtaining polyvinyl chloride compositions containing polyorganosiloxanes is described in U.S. Pat. No. 3,686,356 to Saam. Saam teaches that a copolymer having polyorganosiloxane segments and organic vinylic polymer segments can be employed to provide a homogeneous dispersion of additional polyorganosiloxane in a vinylic thermoplastic. A wide range of polyorganosiloxanes including polychloropropylsiloxanes are taught to be dispersible in an equally wide range of thermoplastics including polyvinyl chloride when the proper copolymer is employed. However, Saam does not suggest that any polyorganosiloxanes could be compatible with polyvinyl chloride without the aid of the organic-siloxane copolymer dispersant.

Although these methods provide more homogeneous and permanent siloxane modified polyvinyl chloride compositions, they all require copolymers of organic and siloxane segments which are often difficult to obtain. It is the purpose of the present invention to provide polyorganosiloxane plasticized polyvinyl chloride compositions that do not exude polyorganosiloxane and that do not require a copolymer of a siloxane with an organic polymer segment to obtain compatibility.

SUMMARY OF THE INVENTION

This invention relates to a plasticized polyvinyl chloride composition consisting essentially of a blend of (A) 88 to 99.9 percent by weight of polyvinyl chloride resin and (B) 0.1 to 12 percent by weight of a siloxane plasticizer which is a polysiloxane fluid containing at least 10 mole percent of 3-chloropropylsiloxane units of the general formula

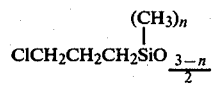

wherein n equals zero, one, or two and any remaining siloxane units consisting essentially of units of the general formula

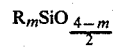

wherein each R is independently selected from the group consisting of methyl radicals and phenyl radicals and m equals one, two, or three.

DETAILED DESCRIPTION OF THE INVENTION

This invention is based on the discovery that polysiloxane fluids containing 3-chloropropylsiloxane units are significantly more compatible with polyvinyl chloride resins than polysiloxane fluids without the 3-chloropropylsiloxane units. Consequently, the siloxane plasticized compositions of this invention have a greatly reduced tendency to exude siloxane and they retain their improved properties for extended periods.

The polyvinyl chloride resins employed in the present invention are well known commercially available thermoplastics. The term "polyvinyl chloride resin" is intended to include the homopolymer of vinyl choride and copolymers of at least about 80 percent by weight of vinyl chloride and up to about 20 percent by weight of other monomers copolymerizable with the vinyl chloride, such as vinyl acetate, vinylidene chloride, and propylene.

The siloxane plasticizer in the present invention is a polysiloxane fluid that can vary in viscosity from a thin liquid to a gum-like material. In other words the viscosity of polysiloxane fluid is not critical for the purposes of this invention. All that is required is that the polysiloxane be sufficiently fluid to be blended with the polyvinyl chloride. The polysiloxane can contain trimethylsiloxane units, 3-chloropropyldimethylsiloxane units, dimethylsiloxane units, 3-chloropropylmethylsiloxane units, phenylmethylsiloxane units, diphenylsiloxane units, monophenylsiloxane units, diphenylmethylsiloxane units, phenyldimethylsiloxane units, mono-3-chloropropylsiloxane units, and monomethylsiloxane units. The polysiloxane can be a homopolymer of 3-chloropropylmethylsiloxane units or can be a copolymer of methyl substituted siloxane units and one or more of the 3-chloropropyl substituted siloxane units. It is preferred for the present invention that the polymethylsiloxane contain at least 10 mole percent of siloxane units with the 3-chloropropyl radical attached to the silicon atom. Of course, it should be recognized that mono-3-chloropropylsiloxane units, monophenylsiloxane units and monomethylsiloxane units should not be present in those amounts which cause the polysiloxane to be cross-linked to such an extent that it is no longer fluid.

The polysiloxanes can be linear, branched or cyclic structures or mixtures of linear, branched and cyclic structures. Linear polysiloxanes can be endblocked with hydroxyl radicals or triorganosiloxy units. The polysiloxanes can be prepared by a number of well known methods for the synthesis of siloxane polymers and copolymers. For example, a preferred method is equilibration of the hydrolyzates of the corresponding organochlorosilanes or organoalkoxysilanes with acid catalysts such as perfluoroalkylsulfonic acid.

In a preferred embodiment of the invention the siloxane plasticizer is a linear polymer consisting essentially of 3-chloropropylmethylsiloxane units. This siloxane plasticizer has excellent compatibility with polyvinyl chloride resins and can be employed to provide plasticized polyvinyl chloride compositions that are clear and haze free.

The blends of polyvinyl chloride resin and siloxane plasticizer can be prepared in several ways. Blends can be prepared by mixing the two components in a solvent and then removing the solvent or solvent solutions of each of the components can be prepared and then the solvent solutions can be mixed and the solvent then removed to provide a blend. Blends can also be prepared by mechanical mixing, particularly where the polyvinyl chloride resin is softened or in the molten state such as in extrusion, injection molding, blow molding, and calendering processes.

To obtain modified properties, the amount of chloropropyl substituted polysiloxane fluid blended with the polyvinyl chloride resin can be 0.1 to 12 percent by weight based on the combined weight of the polyvinyl chloride resin and the polysiloxane fluid. However, preferred degrees of plasticity are obtained when about 1 to 10 percent by weight of the chloropropyl substituted polysiloxane fluid is employed in the compositions of the present invention. The blends of the present invention vary from clear haze free compositions to cloudy opaque compositions. The clarity of a composition increases as the mole percent of chloropropyl substituted siloxane units in the siloxane plasticizer is increased. Similarly, the greater the mole percent of chloropropyl substituted siloxane units in the siloxane plasticizer, the less tendency there is for the siloxane to exude from a composition. Also, the level of chloropropyl substituted siloxane units required in the siloxane plasticizer to obtain a given degree of compatibility increases as the amount of siloxane plasticizer in the composition is increased.

The blends of this invention have the general characteristics of polyvinyl chloride resin, however, they have increased flexibility and elongation. Many of the blends have added advantages of improved lubricity, improved process-ability, improved impact strength and are less flammable than somme polyvinyl chloride compositions highly plasticized with organics.

The compositions of this invention can also contain minor amounts of other commonly employed additives to polyvinyl chloride resins including heat stabilizers, lubricants, processing aids, impact modifiers, fillers and pigments. The blends are useful for provision of molten or extruded articles or otherwise shaped or fabricated articles such as pipes, tubing, sheeting and blown bottles.

The following examples are presented for illustrative purposes only and should not be construed as limiting the present invention which is properly delineated in the claims. All viscosities were measured at 25° C.

EXAMPLE 1

A blend was prepared by dissolving in 1 liter of tetrahydrofuran 90 g of polyvinyl chloride powder and 10 g of trimethylsilyl endblocked poly-3-chloropropylmethylsiloxane fluid with a viscosity of 133 cs. The solvent was allowed to evaporate and residual solvent was removed in a vacuum oven at 50° C. and 133 Pa. A transparent sheet about 2–2.5 mm thick was obtained that had no detectable surface bleed of silicone. The composition had a tensile strength of 12.4 MPa at 330 percent elongation as determined by ASTM-D-638. The unplasticized polyvinyl chloride had a tensile strength of 41.3 MPa at 2 percent elongation by the same test.

EXAMPLE 2

A blend was prepared as in Example 1 employing as the siloxane component a trimethylsilyl endblocked siloxane copolymer of 40 mole percent 3-chloropropylmethylsiloxane units and 60 mole percent dimethylsiloxane units. The siloxane copolymer had a viscosity of 163 cs. The sheet obtained was cloudy, but had no detectable surface bleed of silicone. This composition had a tensile strength of 10.7 MPa at 270 percent elongation.

EXAMPLE 3

A series of polyvinyl chloride compositions containing 2, 5 and 10 percent by weight of siloxane plasticizer based on the total weight of the composition was prepared by the method of Example 1. The two different siloxane fluids employed were (1) a siloxane copolymer containing 20 mole percent mono-3-chloropropylsiloxane units, 60 mole percent dimethylsiloxane units and 20 mole percent trimethylsiloxane units with a viscosity of 32 cs. and (2) a siloxane copolymer containing 20 mole percent 3-chloropropylmethylsiloxane units, 79 mole percent dimethylsiloxane units and 1 mole percent trimethylsiloxane units with a viscosity of 256 cs. For comparison, polyvinyl chloride compositions containing (3) a 350 cs. trimethylsilyl endblocked dimethylsiloxane fluid were also prepared.

The compositions were cast into 2 to 2.5 mm thick sheets which were cloudy and unclear in all cases. The compositions were inspected for surface bleed of siloxane and the tensile and elongation measured as in Example 1. The results are shown in Table 1.

TABLE I

| Siloxane Fluid | Wt. Percent Siloxane | Surface Bleed | Ultimate Tensile (MPa) | Elongation Percent |
|---|---|---|---|---|
| 1 | 2 | No | 14.49 | 465 |
| 1 | 5 | No | 14.98 | 472 |
| 1 | 10 | Yes | 8.56 | 238 |
| 2 | 2 | No | 13.80 | 521 |
| 2 | 5 | No | 13.42 | 523 |
| 2 | 10 | Yes | — | — |
| 3* | 2 | Yes | — | — |
| 3* | 5 | Yes | — | — |

TABLE I-continued

| Siloxane Fluid | Wt. Percent Siloxane | Surface Bleed | Ultimate Tensile (MPa) | Elongation Percent |
|---|---|---|---|---|
| Control | None | — | 41–27.3 | 4–10 |

*For comparison purposes only.

That which is claimed is:

1. A plasticized polyvinyl chloride composition consisting essentially of a blend of (A) 88 to 99.9 percent by weight of polyvinyl chloride resin and (B) 0.1 to 12 percent by weight of a siloxane plasticizer which is a polysiloxane fluid containing at least 10 mole percent of chloropropylsiloxane units such that siloxane (B) is not exuded from the blend of (A) and (B), the chloropropylsiloxane units consisting essentially of units of the general formula $$ClCH_2CH_2CH_2SiO_{\frac{3-n}{2}}^{(CH_3)_n}$$

wherein n equals zero, one or two and any remaining siloxane units consisting essentially of units of the general formula $$R_mSiO_{\frac{4-m}{2}}$$

wherein each R is independently selected from the group consisting of methyl radicals and phenyl radicals and m equals one, two, or three.

2. A composition as defined in claim 1 wherein the siloxane plasticizer consists essentially of chloropropylmethylsiloxane units.

3. A composition as defined in claim 1 wherein 1 to 10 percent by weight of the siloxane plasticizer is employed.